Oct. 26, 1926.

E. H. RYERSON 1,604,608

DISH DRAINER

Filed April 27, 1923    2 Sheets-Sheet 1

Inventor
Eugene H. Ryerson
BY
Attorneys.

Oct. 26, 1926.

E. H. RYERSON

DISH DRAINER

Filed April 27, 1923

Inventor:
Eugene H. Ryerson
By Southgate & Southgate
Attorneys.

Patented Oct. 26, 1926.

1,604,608

UNITED STATES PATENT OFFICE.

EUGENE H. RYERSON, OF WOONSOCKET, RHODE ISLAND.

DISH DRAINER.

Application filed April 27, 1923. Serial No. 635,141.

This invention relates to a dish drainer and especially to that type of this article which is provided with means for holding the plates on edge and separate means for holding knives, forks and spoons, and other small articles.

The principal object of this invention is to provide a dish drainer of the ordinary basket type with a separate detachable rack for supporting the plates on edge, said rack co-operating with the features of the basket to permit of the plates being held in place in this way. Another object of the invention is to provide a movable or detachable basket for holding the cutlery to permit nesting the drainers for shipment and storage. The principal advantage of the detachable rack is that the baskets can be nested together with the racks removed so that the whole outfit can be shipped in much smaller space than is the case if the racks are made in permanent position in the basket. It also is advantageous in connection with the cleaning of the device and the two parts can be sold separately also if desired.

Reference is to be had to the accompanying drawings, in which

Figure 1:
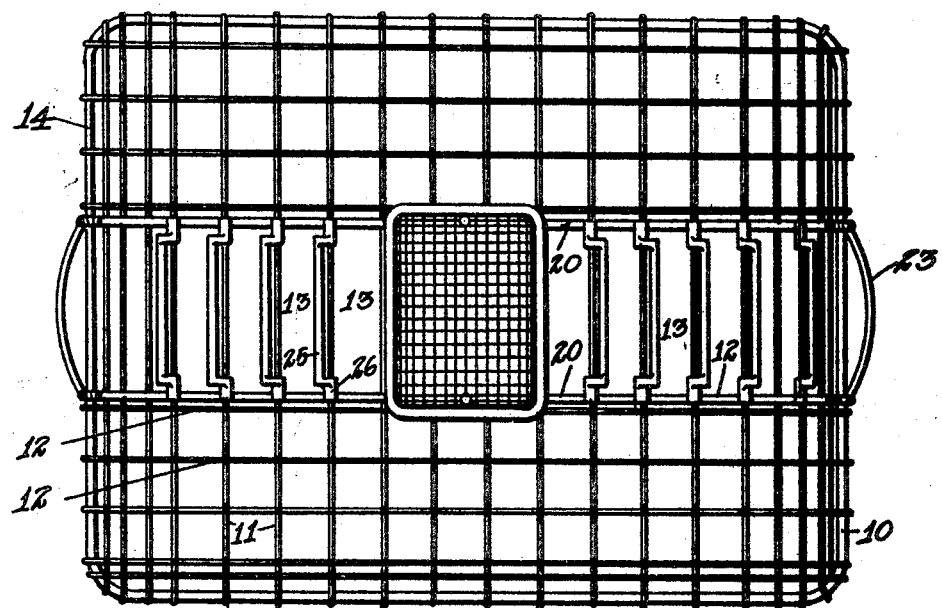
Fig. 1 is a plan of a preferred embodiment of this invention.
Figure 2:
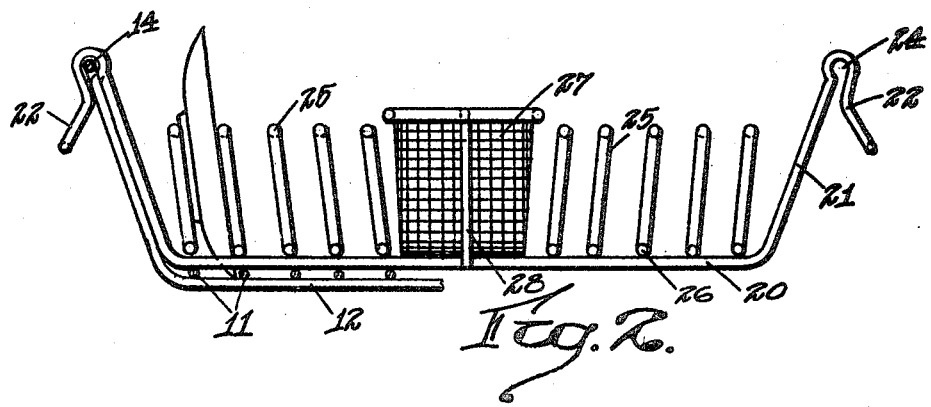
Fig. 2 is a side view of the detachable rack with part of the bottom of the basket shown under it to illustrate the co-operation between the two.
Figure 3:
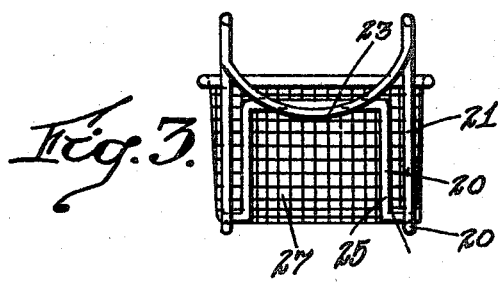
Fig. 3 is an end view of the rack removed from the basket.

Referring first to the first three figures, I have shown an ordinary woven wire basket 10 having cross wires 11 spaced a convenient distance apart for a purpose that will appear. The longitudinal wires 12 can be spaced in any desired way, the spacing not being important but through the center of the rack longitudinally they are omitted, leaving rectangular transverse spaces 13 for the reception of the lower edges of the plates when they are supported in the device as hereinafter described. There is a larger wire 14 around the top of the basket. This basket aside from the features above mentioned can be made in any desired way and is of simple and inexpensive construction.

For the purpose of supporting the plates and other articles, I provide a detachable rack comprising two longitudinal wires 20 of greater diameter and strength than the wires of which the basket is made preferably. These wires extend upwardly at their ends to form inclines 21 oppositely arranged. These inclines at the top are bent over outwardly to form hooks 22 which slant outwardly away from the inclines 21 so that they will easily be guided over the edges of the basket. The inclines and hooks approach each other at 24 to form a space for receiving the top wire 14 and yieldingly holding to it. These hooks are in the form of loops being connected across by an integral part 23 of the wire.

For the purpose of constituting a rack, a series of U-shaped wires 25 are employed having horizontal feet 26 which are soldered, welded or otherwise secured to the longitudinal wires 20. These are spaced apart the same distance at the bottom as the transverse wires 11 of the basket and register with them so that they coincide with the sides of the rectangles 13 and allow the plates to project down slightly below the bottom of the rack and of the basket. These racks preferably are arranged spaced from each other at the two ends and in a slightly slanting position. These are permanently attached to the wires 20 as stated and consequently the whole rack is removable from the basket.

I also prefer to place a basket 27 of woven wire material on the rack and I have shown it in central position thereon. This is held in place by a pair of end wires 28 secured to this basket by soldering to the rectangular top frame or in any other desired way. It is designed for the purpose of holding cutlery and other small articles.

In the use of the device, the plates are set up on edge in the rack with their edges projecting down below it and into the rectangles 13, the cutlery is placed in the small basket 27 and the cups and glasses in the two spaces at the sides of the rack. If desired, the rack can be moved along the basket or over to one side to accommodate larger articles in the basket but in that case the plates held by the rack cannot project down through the bottom of the basket and they are not so accurately and firmly held. The way in which it is intended to be used is that shown in the drawings.

In the form of the invention shown on the last sheet of the drawings, the drainer basket itself is made the same as in the first sheet or substantially so, but the bottom longitudinal wires 30 of the rack are secured to the basket, the upwardly inclined ends 31 being bent around the margin wire of the basket and permanently fixed in position. The plate supporting U-shaped wires 25 are made in the same way as described in connection with Fig. 1 and mounted permanently in the fixed rack. In this case I have shown them as arranged along through the middle of the basket and extending continuously from one end past the center but the series is spaced from the other end.

Figure 4:
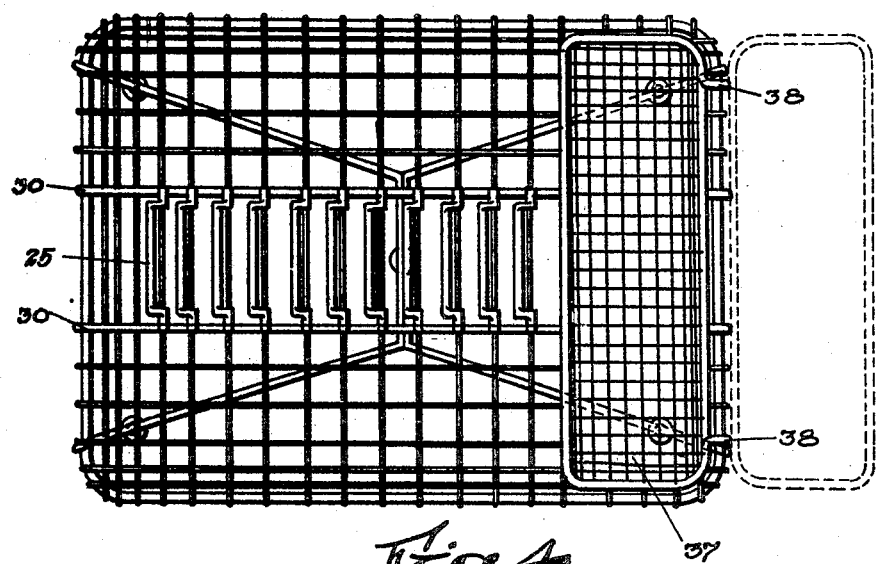
Fig. 4 is a plan of a modified form of this invention.
Figure 5:
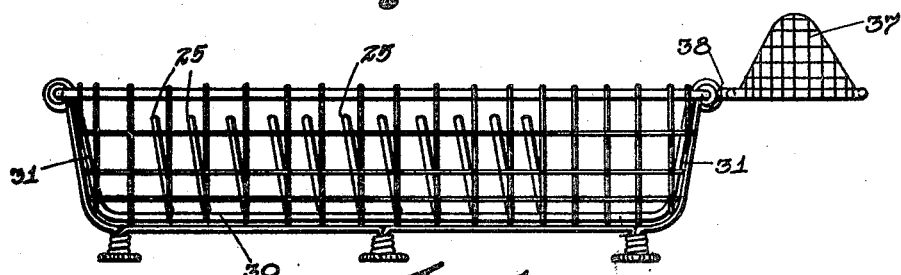
Fig. 5 is a side view of the same.
Figure 6:
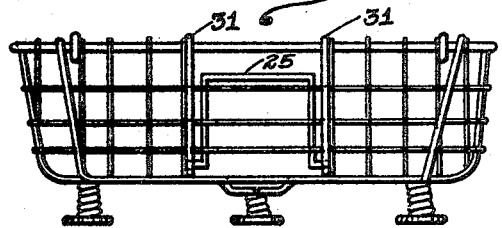
Fig. 6 is an end view thereof.

A cutlery basket 37 made of woven wire fabric with a surrounding frame is located in the space at the end of the rack. It is provided with hinges 38 integral with this frame by which it is pivoted to the end wire of the basket. The object of this construction is to permit of its being turned over into the basket as shown in Fig. 4 in full lines for use therein and also to be turned over outside, as shown in Fig. 5 to facilitate the packing of the device. These can be packed for storage or shipment with this cutlery basket in this position with considerable saving in space on account of the nesting together of a plurality of devices. This also facilitates cleaning. It will be seen that the racks 25 are located in the same relation as the corresponding wires of the main basket 10, as in Fig. 1, and for the same purpose.

In both forms the parts can be removed for cleaning, also the detachment of the rack and the movement of the cutlery basket permits a plurality of these dish drainers to be stored or shipped in small compass.

Although I have illustrated and described only two forms of the invention I am aware of the fact that other modifications can be made therein without departing from the scope of the invention as expressed in the claims. Therefore I do not wish to be limited to all the details of construction herein shown and described but what I do claim is:—

1. As an article of manufacture, a rectangular dish drainer having a central detachable plate draining rack comprising a longitudinal wire frame having detachable connections with the upper edges of the drainer at both ends, and having U-shaped wires arranged in two sets at the ends and slanting oppositely at the two ends, and having a central space for the reception of a cutlery basket.

2. As an article of manufacture, a dish drainer comprising a basket having a wire bottom provided with a series of transverse elongated spaces therein located in alignment through the center of the basket, and a plate draining rack comprising slanting upwardly extending wires the lower end of which register with the edges of said spaces, so that the plates can project through said spaces and rest on said bottom in the spaces thereof.

In testimony whereof I have hereunto affixed my signature.

EUGENE H. RYERSON.